United States Patent [19]
DeLong

[11] Patent Number: 5,857,253
[45] Date of Patent: Jan. 12, 1999

[54] SYSTEM AND METHODS FOR FORMING BUSHING PLATES

[75] Inventor: Mark P. DeLong, Clemmons, N.C.

[73] Assignee: PPG Industries, Inc., Pittsburgh, Pa.

[21] Appl. No.: 618,710

[22] Filed: Mar. 20, 1996

[51] Int. Cl.$^6$ .............. B21K 5/20; B23P 17/00
[52] U.S. Cl. .............. 29/412; 29/412; 76/107.6; 72/325
[58] Field of Search .............. 76/107.6; 72/325; 29/412, 890.142

[56] References Cited

U.S. PATENT DOCUMENTS

| | | | |
|---|---|---|---|
| 3,141,358 | 7/1964 | Burke et al. | 76/107 |
| 3,164,458 | 1/1965 | Mitchell | 65/12 |
| 3,514,841 | 6/1970 | Woodward et al. | 29/480 |
| 3,526,487 | 9/1970 | Bour | 65/1 |
| 3,566,513 | 3/1971 | Fuller | 29/557 |
| 3,598,952 | 8/1971 | Roberson | 219/107 |
| 3,741,460 | 6/1973 | Matulewicz | 228/5 |
| 3,972,702 | 8/1976 | McCormick et al. | 65/1 |
| 3,973,717 | 8/1976 | Jensen | 228/144 |
| 4,078,413 | 3/1978 | McCormick et al. | 72/343 |
| 4,274,852 | 6/1981 | McGarry | 65/2 |
| 4,292,862 | 10/1981 | Thompson | 76/4 |
| 4,461,191 | 7/1984 | Palamara | 76/107 |
| 4,515,610 | 5/1985 | Bhatti | 65/2 |
| 4,515,611 | 5/1985 | Bhatti | 65/2 |
| 4,941,903 | 7/1990 | Jensen | 65/1 |
| 4,957,525 | 9/1990 | Gaertner et al. | 65/1 |
| 5,110,333 | 5/1992 | McCormick | 65/1 |
| 5,140,732 | 8/1992 | DeLong | 29/163.6 |
| 5,147,431 | 9/1992 | Gaertner | 65/1 |
| 5,173,096 | 12/1992 | DeLong | 65/1 |
| 5,244,483 | 9/1993 | Brosch et al. | 65/12 |
| 5,312,470 | 5/1994 | O'Brien-Bernini et al. | 65/12 |

FOREIGN PATENT DOCUMENTS

| | | |
|---|---|---|
| 62-216937 | 9/1987 | Japan . |
| 91033664 | 5/1991 | Japan . |
| 4241108 | 8/1992 | Japan . |
| 4260635 | 9/1992 | Japan . |
| 93029615 | 5/1993 | Japan . |

OTHER PUBLICATIONS

"BalTec PWS 610/32, CNC Metal–Working Centre for the Highest Precision Requirements", a technical bulletin of BalTec Maschinenbau AG.

"BalTec PWS—the complete work station", a technical bulletin of BalTec Maschinenbau AG (Switzerland 1989).

Facsimile from Gerald Yates of BalTec Corporation to John Kuhn of PPG Industries, Inc. dated Mar. 19, 1993.

K. Loewenstein, "The Manufacturing Technology of Continuous Glass Fibres" (2d Ed. 1983) 131–135, 29, 33–35, 47–60, 118–120, 122–125, 86–107, 243–295, 124–129, 182–196.

(List continued on next page.)

*Primary Examiner*—Paul T. Sewell
*Assistant Examiner*—Jila Mohandesi
*Attorney, Agent, or Firm*—Ann Marie Cannoni

[57] ABSTRACT

A system and method for forming a plurality of bushing plates from a metallic plate having a plurality of sections, each corresponding to a bushing plate, and a plurality of predetermined regions in which nozzles are to be formed. The second side of the metallic plate is essentially free of protrusions in the predetermined regions. A periphery of each of the predetermined regions is supported by a support having a cavity shaped to generally correspond to an exterior surface of the nozzle. A first punch having a conical tip is used to displace a portion of the predetermined region into the cavity to form an indentation in the first side of the metallic plate while maintaining the periphery essentially free of any externally applied holding pressure. A second punch having a shape generally corresponding to an interior surface of the nozzle drives the portion of the predetermined region into the cavity while maintaining the periphery essentially free of any externally applied holding pressure to form the nozzle between the second punch and the cavity. An alignment device, nozzle tip finisher and section separator are also included in the system. Another aspect of the present invention is a method for forming a nozzle in a bushing plate.

27 Claims, 8 Drawing Sheets

OTHER PUBLICATIONS

K. Loewenstein, "The Manufacturing Technology of Continuous Glass Fibres", (3d Ed. 1993) 30–36, 126–135, 85–101, 237–287, 186–194, 118–148.

Encyclopedia of Polymer Science and Technology, vol. 6 at 506–507.

"Innovative Bushing Technology", Glass Oct. 1995, pp. 423–424.

"BalTec BT–93/348—Multi–Purpose Cell for Punching, Notching, Contouring, Embossing, Lancing and Bending of Flat Stock Materials—PWS 610/32", technical bulletin of BalTec Corporation, Sep. 15, 1993.

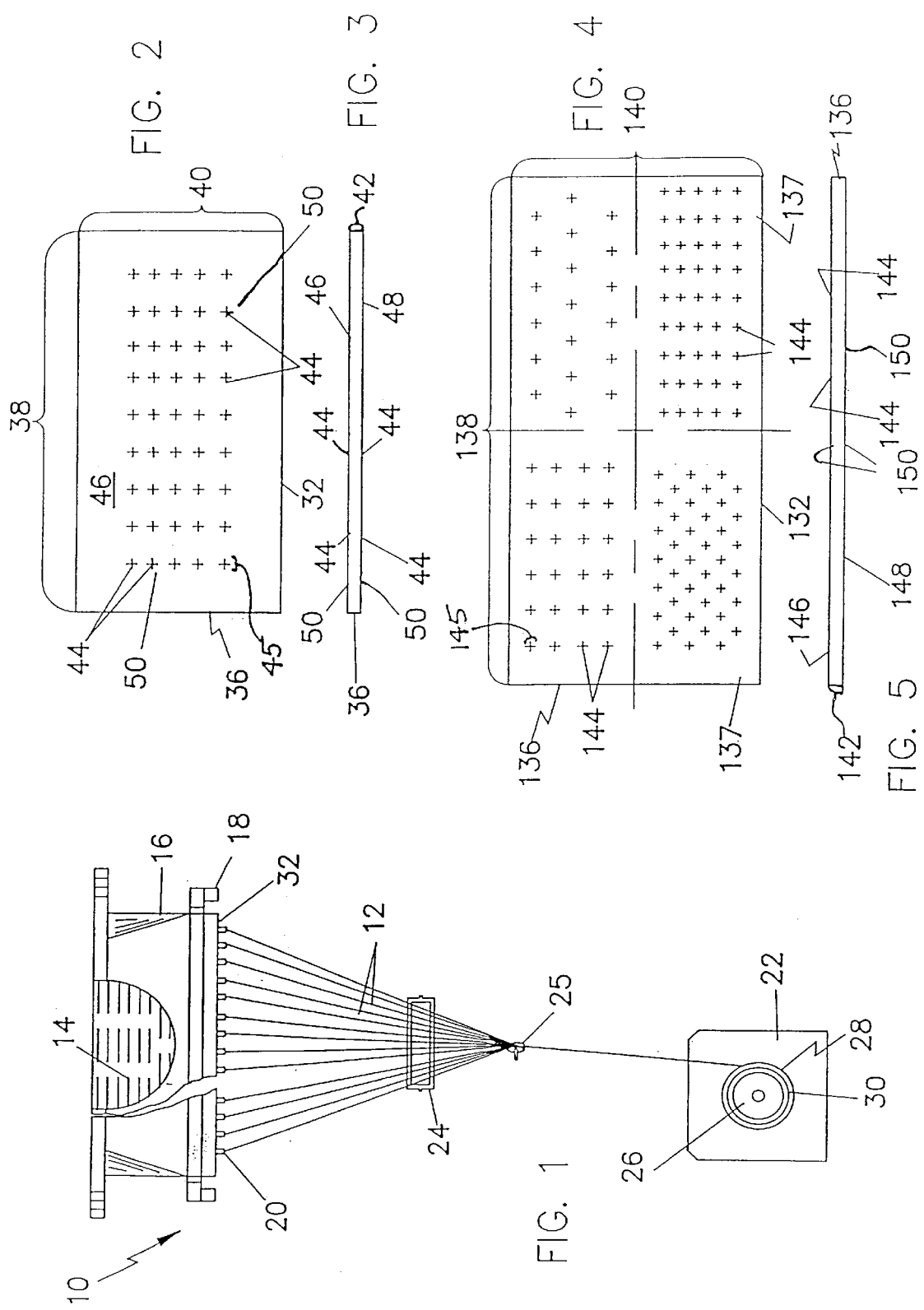

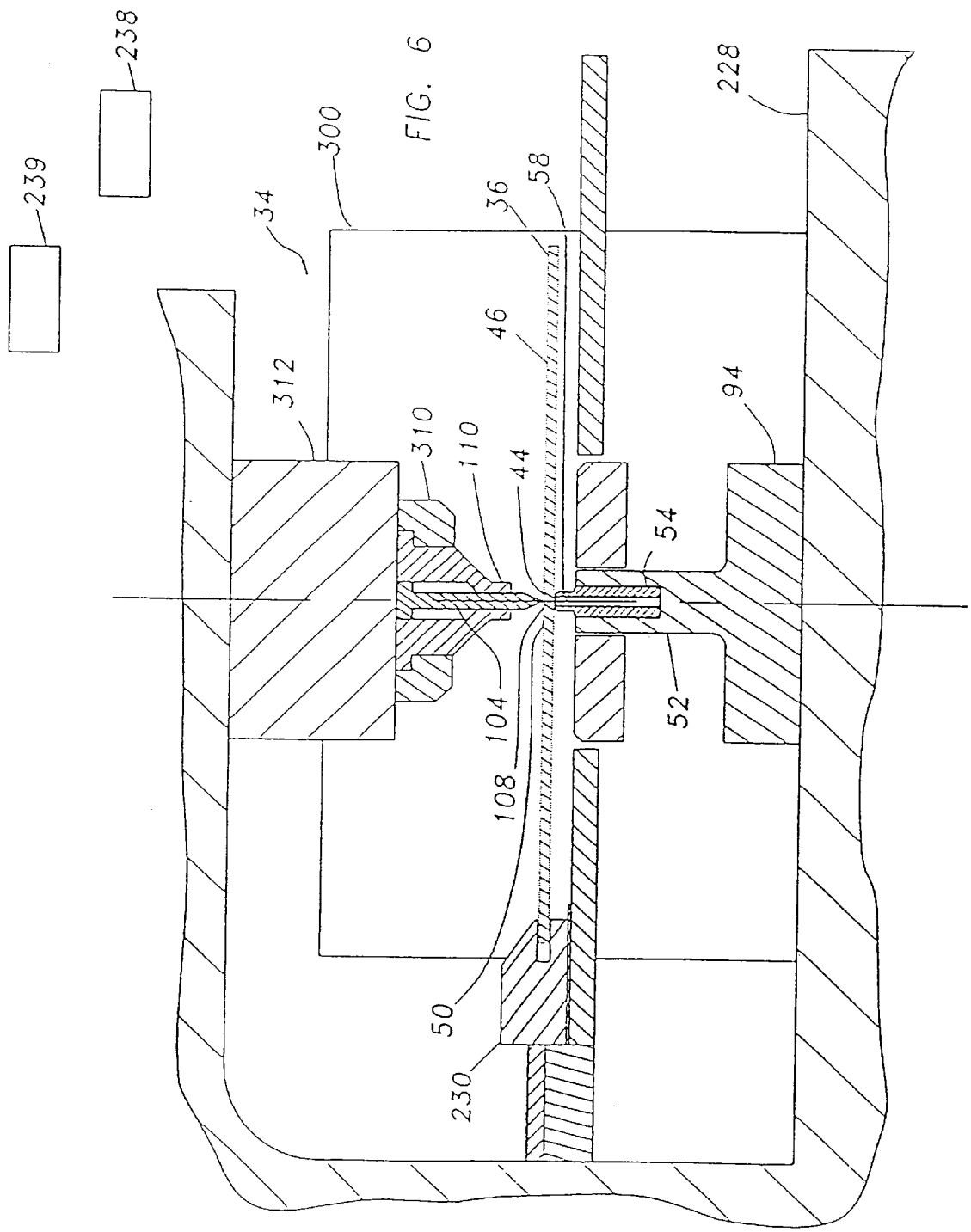

FIG. 11
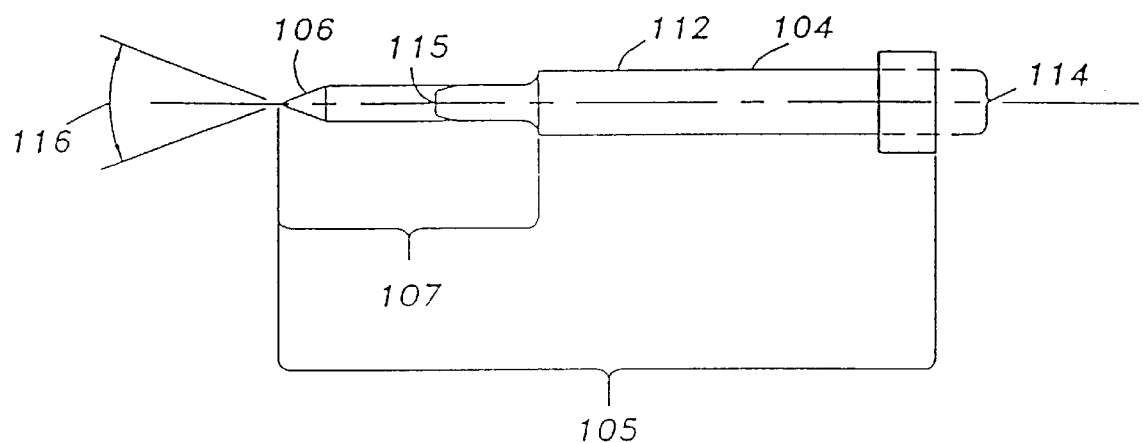
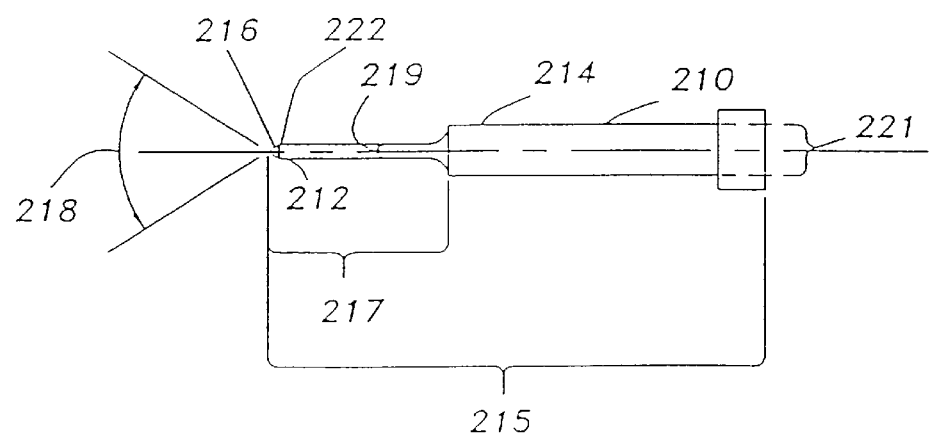
FIG. 12

SYSTEM AND METHODS FOR FORMING BUSHING PLATES

FIELD OF THE INVENTION

The present invention relates to a system and methods for forming bushing plates and, more particularly, a system and method for forming a plurality of bushing plates from a single metallic plate and a method for forming a nozzle in a bushing plate.

BACKGROUND OF THE INVENTION

Glass fibers are typically formed from attenuated streams of molten glass drawn through openings or nozzles in a metallic bushing. The bushing has a plurality of nozzles of predetermined dimension which correspond to the diameter of the glass fibers to be produced. The formation of nozzles in a bushing has been a costly, labor intensive and time-consuming endeavor, due in part to the exacting precision required to form nozzles which consistently meet stringent tolerance criteria on the order of ±0.25 millimeters (±0.001 inches), relatively short bushing life and the metallurgical challenges of working with the precious metal materials of the bushing, such as directionally aligned dispersion strengthened or grain-stabilized metals.

K. Loewenstein, *The Manufacturing Technology of Glass Fibres*, (3d Ed. 1993) at pages 128–132 and (2d Ed. 1983) at pages 131–135 (each of which are hereby incorporated by reference) disclose four conventional methods for fabricating bushing plates. In the first method, a small indentation is created in a platinum alloy sheet. Drops of molten platinum alloy are deposited onto the apices of the indentation and shaped using a press. When an outer nozzle shape has been formed, the end of the nozzle is machined and a bore is drilled through the center of the nozzle to form the final nozzle shape.

In the second and fourth methods, holes are punched in the sheet at each nozzle position. Pre-manufactured nozzles are inserted into the holes and welded (for example by laser welding) to the sheet. If necessary, the center of each nozzle can be drilled and/or counterbored.

In the third method, coins or embossments are stamped on a side of a metal sheet and the sheet is annealed. The nozzles are then deep-drawn in two or three draws and annealed between each draw, if necessary.

The third method has been modified as disclosed in U.S. Pat. No. 5,173,096, in which the coined blisters or embossments are progressively punched with a series of punches which are shaped to progressively form nozzle tips. The tips of the nozzles are trimmed using an electrical discharge machining operation. U.S. Pat. No. 5,140,732 discloses a similar method which further includes forming transitional channels in the surface of the sheet opposite the embossments prior to punching.

U.S. Pat. No. 4,292,862 at col. 3, lines 12–26 discloses a method of producing a stream feeder from a workpiece which is secured by applying pressure to the workpiece in the region to be punched and punching the workpiece with (1) a dome punch to form the general shape of the projection; (2) a lead punch to further define the shape of the projection; (3) a piercing punch to open the projection; and (4) a sizing punch to obtain the desired orifice shape.

Simplified, efficient methods and systems are needed which can consistently produce high quality bushing plates and in which a plurality of bushing plates can be formed from a single metallic plate to increase productivity and reduce cost.

SUMMARY OF THE INVENTION

The present invention provides a system for forming a plurality of bushing plates from a metallic plate, each bushing plate having a plurality of nozzles formed therein, comprising: (a) a metallic plate having a first side, a second side, and a plurality of sections, each of the plurality of sections corresponding to a bushing plate and having a plurality of predetermined regions, wherein a nozzle is to be formed in each of the plurality of predetermined regions, the second side of the metallic plate being essentially free of protrusions in the predetermined regions, each of the plurality of predetermined regions having a periphery; (b) a support for supporting the periphery of each of the plurality of predetermined regions of the second side of the metallic plate, the support having a cavity shaped to generally correspond to an exterior surface of the nozzle to be formed; (c) a first punch having a conical tip for displacing a portion of the predetermined region into the cavity to form an indentation in the first side of the metallic plate in a first step; (d) a second punch, having a shape generally corresponding to an interior surface of the nozzle to be formed, for driving the portion of the predetermined region into the cavity to preliminarily form the nozzle between the second punch and the cavity in a second step and for punching the metallic plate at the indentation to form the nozzle in the metallic plate between the second punch and the cavity in a third step, wherein the periphery of the predetermined region of the first side of the metallic plate is maintained essentially free of any externally applied holding pressure during at least a portion of a step selected from the group consisting of the first step, the second step and the third step; (e) an alignment device for sequentially aligning each of the predetermined regions of the metallic plate with the support, the first punch, the second punch and the pressure member for forming each nozzle in the metallic plate; (f) a finisher for finishing a tip of each of the plurality of nozzles; and (g) a separator for separating the sections to form the plurality of bushing plates.

Another aspect of the present invention is a method for forming a nozzle in a bushing plate, comprising the steps of: (a) aligning a first punch having a conical tip with a cavity of a support; (b) positioning a predetermined region of a metallic plate in which a nozzle is to be formed between the conical tip of the first punch and the cavity, the metallic plate having a first side and a second side which is essentially free of protrusions in the predetermined region, the predetermined region having a periphery; (c) supporting the periphery of the predetermined region of the second side of the metallic plate upon the support; (d) indenting the predetermined region of the first side of the metallic plate with the conical tip of the first punch to displace a portion of the predetermined region into the cavity to form an indentation in the first side of the metallic plate; (e) puncturing the metallic plate at the indentation with a second punch to drive the portion of the predetermined region into the cavity to preliminarily form the nozzle between the second punch and the cavity, the second punch having a shape generally corresponding to an interior surface of the nozzle; and (f) punching the metallic plate at the indentation with the second punch to form the nozzle in the metallic plate between the second punch and the cavity, wherein the periphery of the predetermined region of the first side of the metallic plate is maintained essentially free of any externally applied holding pressure during at least a portion of a step selected from the group consisting of steps (d), (e) and (f).

Another aspect of the present invention is a method for forming a plurality of bushing plates from a metallic plate, each bushing plate having a plurality of nozzles formed therein, comprising the steps of: (a) aligning a first punch having a conical tip with a cavity of a support; (b) positioning a predetermined region of a plurality of predetermined regions of a metallic plate between the conical tip of the first punch and the cavity wherein a nozzle is to be formed in each of the plurality of predetermined regions, the metallic plate having a first side, a second side which is essentially free of protrusions in each of the plurality of predetermined regions, and a plurality of sections, each section corresponding to a bushing plate and having a plurality of predetermined regions, each of the predetermined regions having a periphery; (c) supporting the periphery of each of the plurality of predetermined regions of the second side of the metallic plate upon the support, the support having a cavity shaped to generally correspond to an exterior surface of the nozzle to be formed; (d) indenting the predetermined region of the first side of the metallic plate with the conical tip of the first punch to displace a portion of the predetermined region into the cavity to form an indentation in the first side of the metallic plate; (e) puncturing the metallic plate at the indentation with a second punch to drive the portion of the predetermined region into the cavity to preliminarily form the nozzle between the second punch and the cavity, the second punch having a shape generally corresponding to an interior surface of the nozzle; (f) punching the predetermined region with the second punch for driving the portion of the predetermined region into the to form the nozzle between the second punch and the cavity, wherein the periphery of the predetermined region of the first side of the metallic plate is maintained essentially free of any externally applied holding pressure during at least a portion of a step selected from the group consisting of steps (d), (e) and (f); (g) sequentially aligning each of the predetermined regions of the metallic plate with the support, the first punch and the second punch for forming each nozzle in the metallic plate; (h) finishing a tip of each of the plurality of nozzles; and (i) separating the sections to form the plurality of bushing plates.

BRIEF DESCRIPTION OF THE DRAWINGS

The foregoing summary, as well as the following detailed description of the preferred embodiments, will be better understood when read in conjunction with the appended drawings. In the drawings:

FIG. 1 is a schematic front elevational view of a fiber forming apparatus, in accordance with the present invention;

FIG. 2 is a schematic top plan view of a bushing plate prior to forming nozzles therein and having a plurality of predetermined regions according to the present invention;

FIG. 3 is a schematic side elevational view of the bushing plate of FIG. 2;

FIG. 4 is a schematic top plan view of a metallic plate prior to forming nozzles therein having a plurality of bushing plate sections and predetermined regions according to the present invention;

FIG. 5 is a schematic side elevational view of the metallic plate of FIG. 4;

FIG. 6 is a schematic side elevational view of a portion of an apparatus for forming one or more bushing plates according to the present invention;

FIG. 11 is a side elevational view of a first punch, according to the present invention;

FIG. 12 is a side elevational view of a second punch, according to the present invention;

DETAILED DESCRIPTION OF THE INVENTION

Figure 7:
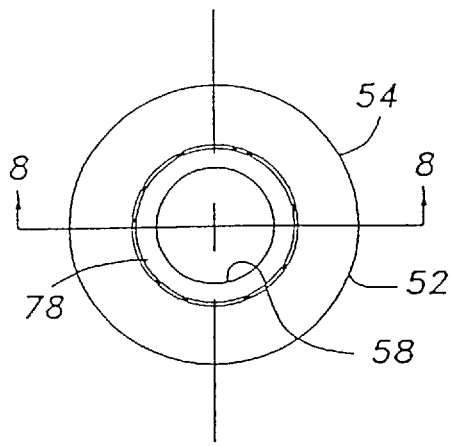
FIG. 7 is a top plan view of a forming die according to the present invention.

The system and methods of the present invention are capable of consistently producing high quality bushing plates and of forming a plurality of bushing plates from a single metallic plate to increase productivity and reduce labor and material cost. Nozzles can be formed in the bushing plate with minimal distortion or elongation of the metallic plate material.

Referring to the drawings, wherein like numerals indicate like elements throughout, there is shown in FIG. 1 a fiber forming apparatus, indicated generally at 10, for producing a plurality of continuous fibers 12. As used herein, the term "fibers" means a plurality of individual filaments. The preferred material from which the fibers are formed is glass, although one skilled in the art would understand that the present system and methods can be useful for producing apparatus for forming fibers from other fiberizable materials, such as natural organic polymers, synthetic organic polymers or inorganic substances, which can be drawn into fibers by attenuation through a nozzle. See *Encyclopedia of Polymer Science and Technology,* Vol. 6 at 506–507. As used herein, the term "fiberizable" means a material capable of being formed into a generally continuous filament.

Useful glass materials include any type of fiberizable glass composition known to those skilled in the art, such as "E-glass", "A-glass", "C-glass", "D-glass", "R-glass", "S-glass", and E-glass derivatives that are fluorine-free and/or boron-free. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, *The Manufacturing Technology of Glass Fibres,* (3d Ed. 1993) at pages 30–36 and (2d Ed. 1983) at pages 29, 33–45, 47–60, 118–120 and 122–125, which are hereby incorporated by reference.

The present invention will now be discussed generally in connection with its use in forming glass fibers, although one skilled in the art would understand that other types of fibers can be formed according to the present invention, as set forth above.

The fiber forming apparatus 10 comprises a glass melting furnace or forehearth (not shown) containing a supply of a fiber forming mass or molten glass 14 having a metallic bushing 16 attached to the bottom of the forehearth. For clarity in the drawing, the ceramic materials, cooling tubes and fins surrounding the metallic bushing have been omitted. Typical forehearths are shown in Loewenstein (3d Ed.) at pages 85–101 and (2d Ed.) at pages 86–107, which are hereby incorporated by reference. Alternatively, the fiber forming apparatus 10 can be, for example, a forming device for synthetic textile fibers or strands in which fibers are drawn from nozzles.

Bus bars are connected to an electrical energy source and to the bushing 16 at conductors 18 to heat the bushing 16 and molten glass 14 contained therein. The molten glass 14 is drawn through a plurality of nozzles 20 by a winder 22 to form glass fibers 12. Typically, the glass fibers 12 are contacted with an applicator 24 to apply a sizing composition thereto. Examples of suitable sizing compositions are set forth in Loewenstein at pages 237–287 (3d Ed.) and pages 243–295 (2d Ed.), which are hereby incorporated by reference. The glass fibers 12 can be gathered together by a guide 25 or gathering shoe prior to winding. The winder 22 comprises a rotatable packaging collector or collet 26 about which the fibers 12 are wound to form a forming package 28. Preferably, the forming package is wound upon a tube 30 which is removably telescoped onto the collet 26. The winder 22 can be any conventional winder for winding standard forming packages, such as are discussed in Loewenstein at pages 186–194 (3d Ed.) and pages 182–196 (2d Ed.), which are hereby incorporated by reference.

As shown in FIG. 1, the bushing 16 or fiber-drawing furnace comprises a bushing plate 32 (also shown in FIGS. 22–25) having a plurality of nozzles 20 through which molten glass is drawn in the form of individual fibers 12 or filaments at a high rate of speed. See Loewenstein at pages 118–148 (3d Ed.), which are hereby incorporated by reference. The nozzles 20 are maintained at a uniform temperature during drawing of the molten glass 14 therethrough. The bushing 16 conditions the glass so that the fibers produced have an essentially uniform diameter.

The bushing plate 32 is formed from a metallic plate or material and alloys thereof by conventional metalworking and processing techniques well known to those skilled in the art. The metallic material must be resistant to corrosion by glass, not degrade to contaminate the glass, oxidation resistant, and possess steady electrical resistance and resistance to creep (deformation under load, which is a function of stress). See Loewenstein at pages 122–126 (3d Ed.) and pages 124–129 (2d Ed.), which are hereby incorporated by reference.

Non-limiting examples of suitable metallic materials for forming the bushing plate 32 include platinum, palladium, ruthenium, iridium and rhodium and alloys thereof. Preferably, the metallic material is about a 10% to about 20% platinum-rhodium alloy, and more preferably about 20% platinum-rhodium alloy.

The metallic materials can be dispersion strengthened or grain-stabilized to reduce creep, if desired. The metallic material can be dispersion strengthened with a metal compound selected from metal oxide, metal carbide, metal nitride, metal silicide, metal sulfide or a metal boride present in effective dispersion strengthening amounts, typically about 0.1 percent to about 5 percent by volume. Compounds of metals of Group IIA, IIIA, IIIB, IVB, VB, VIB, and VIIB are believed to be useful dispersoids. Non-limiting examples of suitable metal compounds are believed to include those compounds of the following metals: beryllium, magnesium, calcium, barium, yttrium, titanium, zirconium, lanthanum, hafnium, molybdenum, wolfram, cerium, neodymium, gadolinium and thorium. See Loewenstein (2d Ed.) at page 127. Dispersion strengthened metal metallic plates are commercially available as ZGS products from Johnson, Matthey & Co. Ltd. of Malvern, Pennsylvania. Grain-stabilized metallic materials formed from elemental metals such as those described above are also useful in the present invention. As used herein, the term "grain-stabilized" means that the metallic material resists creep at elevated temperatures of about 927° C. to about 1316° C. (about 1700° to about 2400° F.).

The system, indicated generally at 34 in FIG. 6, according to the present invention which can be used to form one or more bushing plates 32 having one or more nozzles 20 in each bushing plate 32 will now be discussed.

The system 34 comprises one or more metallic plate(s) 36, 136 formed from a metallic material such as is discussed above. In a first embodiment, a bushing plate 32 is formed from a metallic plate 36 such as is shown in FIGS. 2 and 3. In a second embodiment, the metallic plate 136 (shown in FIGS. 4 and 5) has a plurality of sections 137, each of the plurality of sections 137 corresponding to a bushing plate 132 to be formed.

As shown in FIG. 2, the length 38 and width 40 of the bushing plate 32 can vary, but generally the length of the bushing plate 32 is about 25 to about 61 centimeters (cm) (about 10 to about 24 inches) and the width is about 6 to about 14 cm (about 2.5 to about 5.5 inches). The metallic plate 136 shown in FIG. 4 has an overall length 138 and an overall width 140 which includes at least the length 38 and width 40 of each of the plurality of sections 137 therein, each section 137 corresponding to a bushing plate 132. The metallic plate 136 can also include additional areas in which no bushing plate is to be formed, for example for handling convenience.

As shown in FIG. 3, the bushing plate 32 generally has a thickness 42 of about 1 to about 1.3 millimeters (mm) (about 0.04 to about 0.05 inches), and preferably about 1.19 to about 1.24 mm (about 0.047 to about 0.049 inches), although the thickness can vary. The thickness 142 of each of the plurality of sections 137 corresponds generally to the thickness 42 of a bushing plate 32. One skilled in the art would understand that the dimensions of the metallic plate 36, 136 and bushing plate 32, 132 can vary as desired.

Referring to FIGS. 2–5, the metallic plate 36, 136 has one or a plurality of predetermined regions 44, 144 wherein a nozzle 20 is to be formed in each of the predetermined regions 44, 144. The metallic plate 36, 136 also has a first side 46, 146 and a second side 48, 148. Both the first side 46, 146 and the second side 48, 148 of the metallic plate 36, 136 are preferably generally flat. The sides 46, 146, 48 and 148 can have ridges or protrusions, if desired, except that the second side 48, 148 of the metallic plate 36, 136 is essentially free of protrusions, such as embossments or coins produced by coining, in the predetermined regions 44, 144. Preferably, the second side 48, 148 of the metallic plate 36, 136 is free of protrusions in the predetermined regions 44, 144.

As used herein, the terms "embossment" or "coin" mean blisters or generally cylindrical portions raised from the second side 48, 148 of the metallic plate 36, 136, for example by a cold forming press operation in which the metallic plate 36, 136 is progressively cold flowed into the lower half of a series of die tools having progressively deeper cavities.

Each of the predetermined regions 44, 144 has a diameter 45, 145 which is slightly greater than or equal to the diameter 21 (shown in FIG. 19) of the corresponding nozzle 20 to be formed therein. The diameter 21 of the nozzle 20 can vary, but preferably is about 2.5 to about 3 mm (about 0.1 to about 0.12 inches) and more preferably is about 2.75 to about 3 mm. Each of the predetermined regions 44, 144 has a periphery 50, 150 surrounding the diameter 45, 145. Generally, the periphery 50, 150 is the area of the metallic plate 36, 136 between the nozzles 20 or predetermined regions 44, 144.

The overall length 23 of the nozzle 20 can vary, but preferably is about 4 to about 4.4 mm (about 0.16 to about 0.17 inches) and more preferably is about 4.2 to about 4.3 mm before finishing. After finishing, the overall length of the nozzle 20 can be about 3 to about 3.6 mm (about 0.12 to about 0.14 inches). The nozzles 20 can be aligned in rows or offset, as desired. The spacing between each nozzle 20 can be about 3.3 mm to about 3.6 mm (about 0.13 to about 0.14 inches) and is preferably generally equal to the periphery 50, 150 between the nozzles. The nozzle dimensions can vary as desired.

Figure 18:
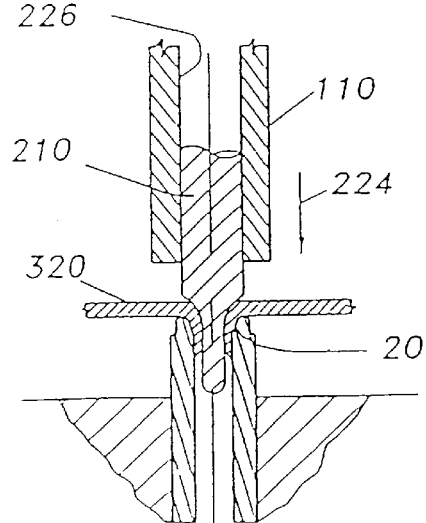
FIG. 18 is a schematic cross-sectional view of punching the indentation with the second punch while maintaining an externally applied holding pressure on the periphery of the predetermined region during at least a portion of the punching step to form the nozzle in the metallic plate.
Figure 19:
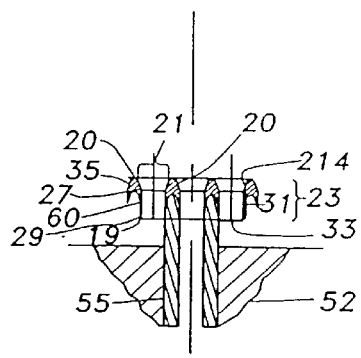
FIG. 19 is a schematic cross-sectional view of a portion of the system showing a plurality of nozzles formed in a bushing plate according to the present invention.

The nozzle 20 can be of any shape desired, examples of which are disclosed in FIGS. 18 and 19 and in Loewenstein (3d Ed.) at pages 126–135, which is hereby incorporated by reference. A preferred nozzle shape is shown in FIG. 19. In FIG. 19, the nozzle 20 has a generally conical upper section 27 and a generally cylindrical lower section 29. The length 31 of the lower section 29 can be about 2 to about 2.5 mm (about 0.08 to about 0.1 inches). The interior diameter 33 of the lower section 29 can be about 1 to about 2.5 mm (about 0.04 to about 0.1 inches). The angle 35 between the upper section 27 and lower section 29 can be about 30 to about 60 degrees, preferably about 40 to about 50 degrees, and is more preferably about 45 degrees. One skilled in the art would understand that the shape, overall length 23, angle 35, length 31 and interior diameter 33 of the nozzle can vary, and can be determined, for example, by modified Poiseuille's equations such as are disclosed in Loewenstein (3d Ed.) at page 131.

The system 34 comprises one or more support(s) 52 for supporting the periphery 50, 150 of each of the predetermined regions 44, 144 of the second side 48, 148 of the metallic plate 36, 136. The support 52 is preferably formed from a rigid metal, such as M-2, M-3 or M-4 high speed, high carbon, high chromium steel. For example, M-2 high speed steel has about 0.85% carbon, about 4% chromium, about 2% vanadium and about 5% molybdenum and M-4 high speed steel has about 1.3% carbon, about 4.3% chromium, about 4% vanadium and about 4% molybdenum.

Figure 8:
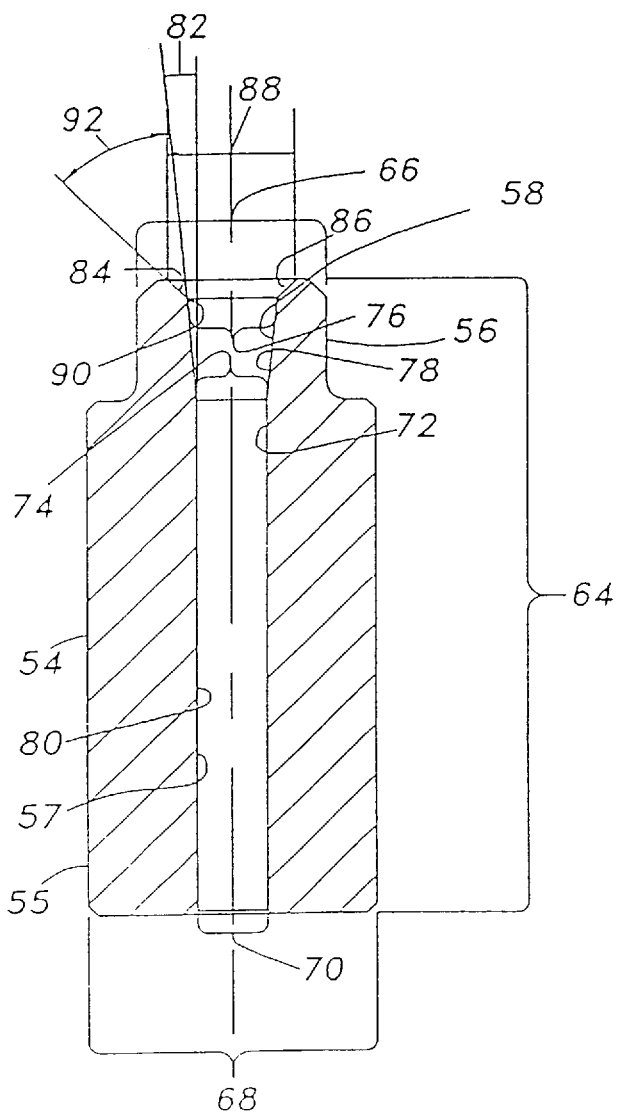
FIG. 8 is a cross-sectional view of the forming die of FIG. 7 taken along line 8—8 of FIG. 7.

The support 52 preferably comprises a forming die 54, shown in FIGS. 7 and 8, which can be formed from any rigid metal such as those discussed above. The forming die 54 is generally cylindrical and includes a lower portion 55 having a bore 57 and a tapered, upper portion 56 having a cavity 58 shaped to generally correspond to an exterior surface 60 of the nozzle 20 to be formed. The length 64 of the forming die 54 can be about 20 to about 25 mm, and preferably about 22.2 to about 23.8 mm (about 0.875 to about 0.938 inches). The average outer diameter 66 of the upper portion 56 can be about 5 to about 6 mm, and preferably about 5.1 to about 5.6 mm (about 0.200 to about 0.220 inches). The average outer diameter 68 of the lower portion 55 can be about 8 to about 12 mm, and preferably about 8.7 to about 11.1 mm (about 0.343 to about 0.438 inches). The average inner diameter 70 of the lower portion 55 of the forming die 54 can be about 1 to about 3 mm, and preferably about 1.8 to about 2.5 mm (about 0.070 to about 0.100 inches).

Referring to FIG. 8, the cavity 58 has a first portion 72 adjacent to the lower portion 55 of the forming die 54 which has a lower diameter 74 generally equal to the average inner diameter 70 of the lower portion 55 and an upper diameter 76 of about 1 to about 5 mm (preferably about 3 to about 3.3 mm (about 0.120 to about 0.130 inches)), such that the wall 78 between the lower diameter 74 and the upper diameter 76 forms an angle 82 of about 2° to about 10° (preferably about 5° to about 7°) with the wall 80 of the bore 57.

The cavity 58 has a second portion 84 adjacent to the first portion 72 and forming an opening 86 to the cavity 58. The second portion 84 has a diameter 88 at the opening 86 of about 2 to about 4 mm (preferably about 2.8 to about 3.3 mm (about 0.110 to about 0.130 inches)), such the wall 90 of the second portion 84 forms an angle 92 of about 50° to about 75° (preferably about 60° to about 70°) with the wall 80 of the bore 57.

One skilled in the art would understand that the dimensions for the forming die 54 discussed above can vary depending upon such factors as the dimensions of the nozzle to be formed and the strength of the material from which the forming die is fabricated.

Figure 9:
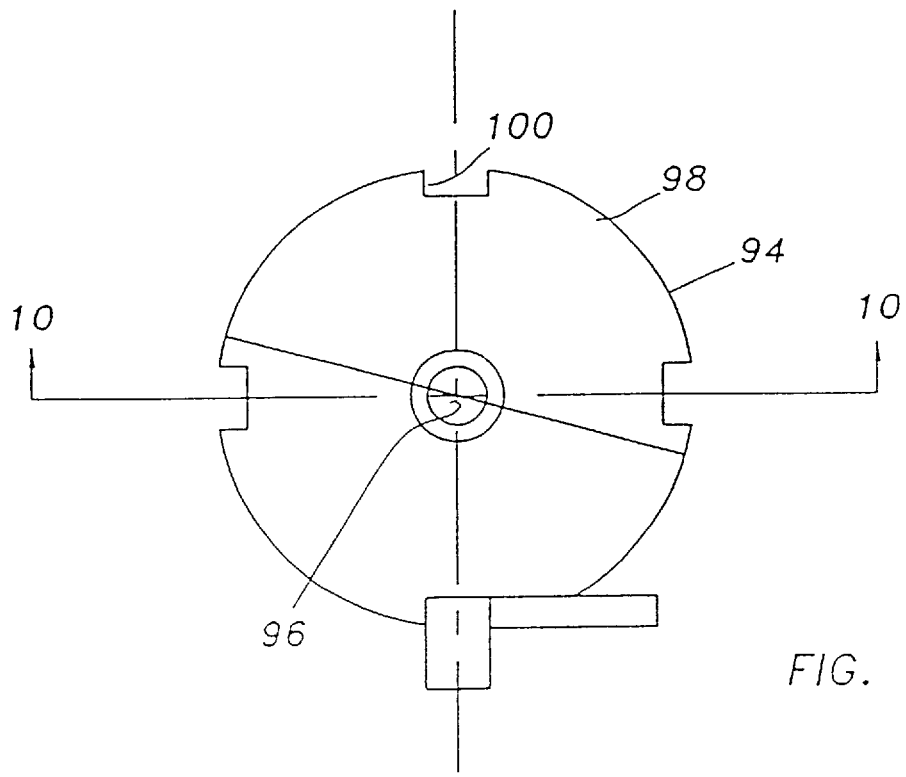
FIG. 9 is a top plan view of a die holder according to the present invention.
Figure 10:
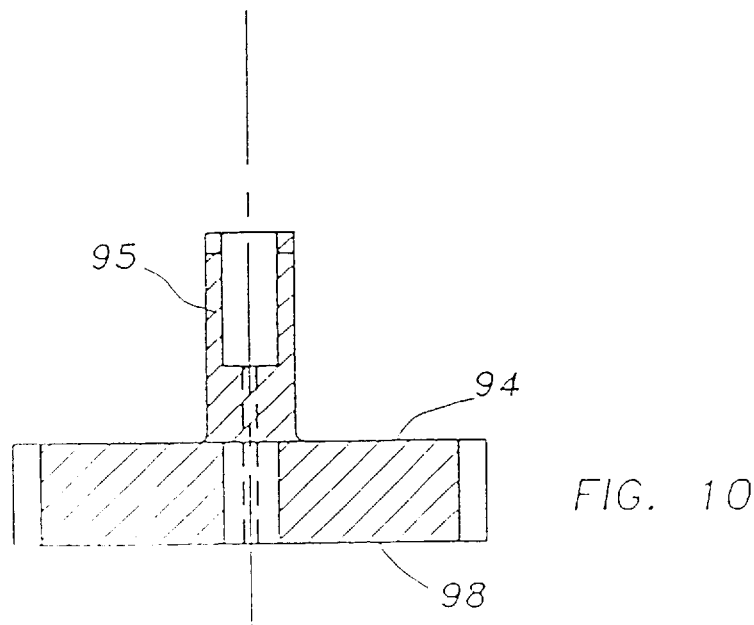
FIG. 10 is a cross-sectional view of the die holder of FIG. 9 taken along line 10—10 of Fig. 9.
Figure 13:
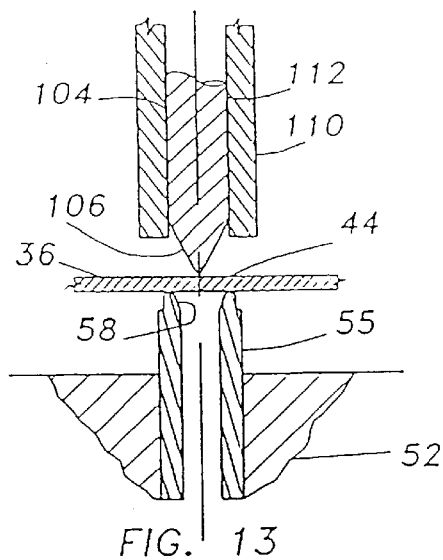
FIG. 13 is a schematic cross-sectional view of aligning the first punch, support and metallic plate according to the present invention.

As shown in FIGS. 6, 9 and 10, the support 52 preferably comprises a die holder 94 having an upper portion 95 having a generally cylindrical bore 96 therethrough for receiving and retaining the lower portion 55 of the forming die 54 therein. The die holder 94 has a base 98 having a retainer 100 which is received and retained during punching in a slot (not shown) of the system 34. The base 98 has an average diameter of about 5 to about 8 centimeters, (preferably about 6.4 to about 7.6 centimeters (about 2.5 to about 3 inches)) and a thickness of about 10 to about 20 mm (preferably about 12.7 to about 15.9 mm (about ½ to about ⅝ inches)).

One skilled in the art would understand that the die holder 94 can have any configuration desired which retains and secures the forming die 54 for the punching operations, or can alternatively be omitted such that the forming die 54 is secured directly to the other components of the system 34

As shown in FIG. 6, the predetermined region 44 of the metallic plate 36 is aligned between the forming die 54 of the support 52 and a first punch 104. As shown in FIGS. 6, 11,13 and 14, the system 34 comprises one or more first punch(es) 104 having a generally conical tip 106 for displacing a portion 108 of the predetermined region 44 into the cavity 58 in a first step to form an indentation 109 in the first side 46 of the metallic plate 36 while preferably maintaining the periphery 50 of the predetermined region 44 of the first side 46 of the metallic plate 36 essentially free of any externally applied holding pressure.

As used herein, "essentially free of any externally applied holding pressure" means that during at least a portion of the first, second and/or third steps, the periphery 50 of the predetermined region 44 of the first side 46 of the metallic plate 36 is essentially free of any externally applied holding pressure other than the weight of the down-holder 110 itself which is preferably less than about 227 grams (about 0.5 pounds). Exerting external holding pressure onto the periphery 50, 150 of the metallic plate 36, 136 can distort dispersion strengthened and grain-stabilized metallic materials.

Figure 14:
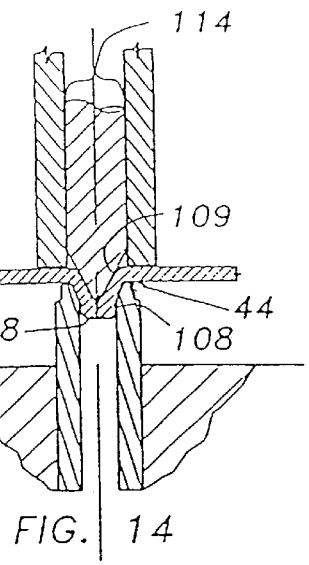
FIG. 14 is a schematic cross-sectional view of indenting the metallic plate with the first punch according to the present invention.
Figure 15:
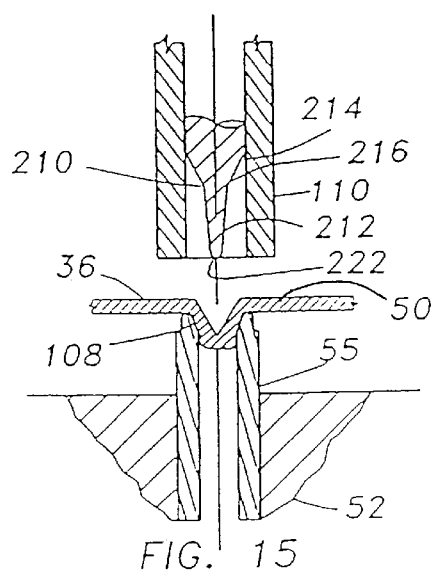
FIG. 15 is a schematic cross-sectional view of the second punch prior to puncturing the metallic plate at the indentation according to the present invention.
Figure 16:
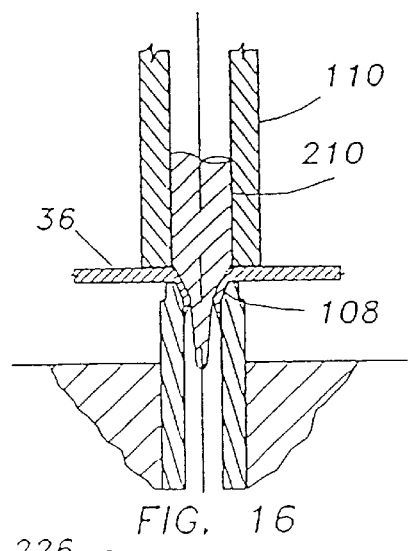
FIG. 16 is a schematic cross-sectional view of puncturing the metallic plate at the indentation with the second punch according to the present invention.
Figure 17:
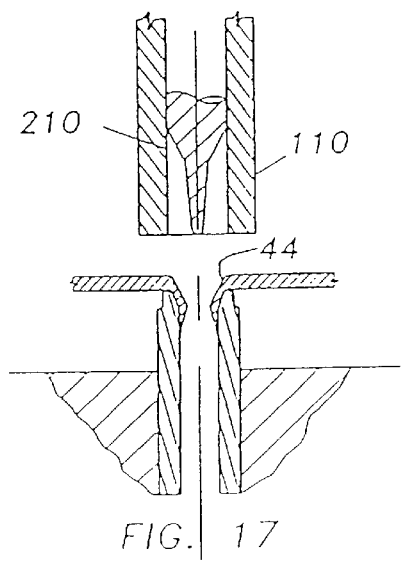
FIG. 17 is a schematic cross-sectional view of the second punch after puncturing the indentation but prior to punching the indentation.

Preferably, as shown in FIG. 14, the predetermined region 44 has the indentation 109 formed therein while maintaining the periphery 50 of the predetermined region 44 free of any externally applied holding pressure, other than the weight of the down-holder 110, which is discussed below.

As shown in FIGS. 6, 13–18 and 20–21, the system 34 can comprise a pressure member or down-holder 110 which aligns the punches and can apply an external holding pressure, indicated generally by arrow 224 in FIG. 18, to the periphery 50 of the predetermined region 44 of the metallic plate 36 during any portion of the first through third steps, if desired, to form the final configuration of the nozzle 20. One skilled in the art would understand that the forming die 54 can be driven towards the punch in any of the above steps, in contrast to driving the punch towards the forming die 54. The system 34 also includes a retainer 310 for releasably securing the down-holder 110 to the punch press 312.

The down-holder 110 is preferably generally cylindrical, although the shape can vary as desired. The down-holder 110 has a cavity 226 for slidably receiving the individual first and second punches 104, 210 therein. The diameter of the cavity 226 is generally slightly larger than the diameter of the body of the punch inserted therein. One skilled in the art would understand that different down-holders can be used with different punches or a plurality of down-holders can be used with a corresponding plurality of punches for essentially simultaneously producing a plurality of nozzles to increase efficiency.

Figure 20:
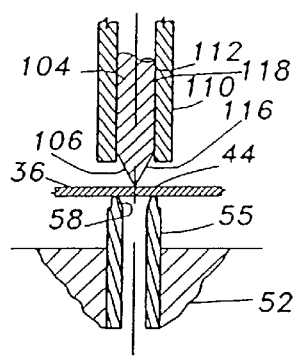
FIG. 20 is a schematic cross-sectional view of aligning another first punch, support and metallic plate according to the present invention.

A plurality of first punches 104 can be used if desired to form a plurality of indentations 109 essentially simultaneously, which would increase efficiency. Also, if desired, first punches 104 having different conical tips can be used to form indentations of different configurations corresponding to nozzles having different configurations, as shown in FIG. 20.

The first punch 104 is formed from a rigid material such as metal, preferably M-2, M-3 or M-4 high speed steel, and can be coated with a wear resistant coating such as titanium nitride. As shown in FIG. 11, the first punch 104 preferably has a generally cylindrical body 112 and a conical tip 106 at the end of the body 112 which forms the indentation 109 in the predetermined region 44. The overall length 105 of the body 112 can be about 50 to about 75 mm, and preferably is about 61.3 mm to about 62 mm (about 2.415 to about 2.425 inches). The average length 107 of the tip can be about 20 to about 30 mm, and preferably is about 23.9 mm to about 24.2 mm (about 0.939 to about 0.954 inches).

The average diameter 114 of the body 112 is about 5 to about 8 mm, and preferably about 6 mm (about 0.2358 to about 0.2360 inches). The average diameter 115 of the tip 106 is about 3 to about 5 mm, and preferably about 3.7 to about 3.9 mm (about 0.145 to about 0.155 inches). The conical tip 106 forms an angle 116 of about 30° to about 60°, preferably about 40° to about 50°, and more preferably about 45°.

One skilled in the art would understand that the lengths 105,107, diameters 114, 115 and angle 116 of the first punch 104 discussed above can vary as desired.

The first punch 104 can be forced into contact with the metallic plate 36, 136 by a punch press 312, such as a manual or automatic hydraulic punch press. Suitable punch presses are well known to those skilled in the art and further discussion thereof is not believed to be necessary in view of the discussion herein and example provided below. The pressure at which the first punch 104 impacts the first side 46 of the metallic plate 36, 136 to form the indentation 109 can be about 3 tons to about 7 tons, and preferably about 5 to about 6 tons for a metallic plate 36, 136 having a thickness of about 1 mm to about 1.3 mm (about 0.040 to about 0.050 inches). The pressure can vary based upon such factors as the configuration of the punch and thickness of the metallic plate.

While the indentation 109 can be less than the thickness 42 of the metallic plate 36, it is preferred that the indentation 109 be greater than the thickness 42 of the metallic plate 36, or preferably about 150 percent to about 200 percent of the thickness 42 of the metallic plate 36 such that the first punch 104 punctures the metallic plate 36.

As shown in FIGS. 12, 15–18 and 21, the system 34 comprises one or more second punch(es) 210 having a shape 212 generally corresponding to an interior surface 214 of the nozzle 20 to be formed for driving the portion 108 of the predetermined region 44 into the cavity 58 in a second step to preliminarily form the nozzle 20 between the second punch 210 and the cavity 58. Preferably, the portion 108 of the predetermined region 44 is driven into the cavity 58 while maintaining the periphery 50 of the predetermined region 44 essentially free (and more preferably free) of any externally applied holding pressure, other than the weight of the down-holder 110.

A plurality of second punches 210 can be used if desired to preliminarily form a plurality of nozzles 20 sequentially or essentially simultaneously, which would increase efficiency. Also, if desired, second punches 210 having different configurations, such as those shown in FIGS. 12 and 15, can be used to form nozzles of different configurations.

The second punch 210 can be forced into contact with the metallic plate 36, 136 by a punch press 312, as discussed above. The pressure at which the second punch 210 impacts the first side 46 of the metallic plate 36, 136 to puncture the indentation 109 can be about 3 tons to 7 tons, and preferably about 5 to about 6 tons for a metallic plate 36, 136 having a thickness of about 1 mm to about 1.3 mm (about 0.040 to about 0.050 inches). One skilled in the art would understand that the pressure can vary based upon such factors as the plate thickness and punch configuration.

The second punch 210 is formed from a rigid metal, such as M-2, M-3 or M-4 high speed steel discussed above and can be coated with a wear resistant coating such as titanium nitride. The second punch 210 has a generally cylindrical body 214 and a tapered portion 216 at the end of the body 214 which drives the portion 108 of the predetermined region 44 into the cavity 58 to preliminarily form the portion 108 into the configuration of the nozzle 20.

The overall length 215 of the body 214 can be about 50 to about 75 mm, and preferably is about 61.3 mm to about 62 mm (about 2.415 to about 2.425 inches). The length 217 of the tapered portion 216 can be about 20 to about 30 mm, and preferably is about 23.9 mm to about 24.2 mm (about 0.939 to about 0.954 inches).

The diameter 221 of the body 214 can be about 5 to about 8 mm, and preferably is about 6 mm (about 0.2358 to about 0.2360 inches). The diameter 219 of the tapered portion 216 is generally equal to the interior diameter 33 of the lower section 29 of the nozzle 20, non-limiting examples of which are set forth above.

Figure 21:
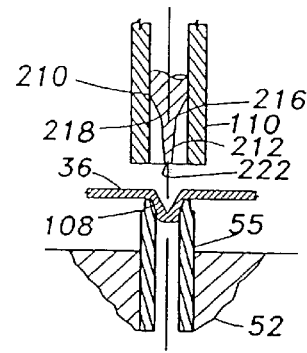
FIG. 21 is a schematic cross-sectional view of another second punch prior to puncturing the metallic plate at the indentation according to the present invention.
Figure 22:
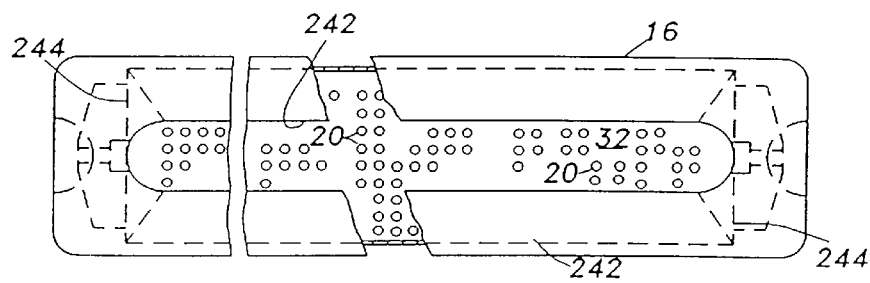
FIG. 22 is a top plan view of a bushing according to the present invention.
Figure 23:
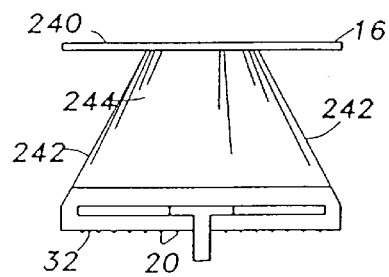
FIG. 23 is an end view of the bushing of FIG. 22.
Figure 24:
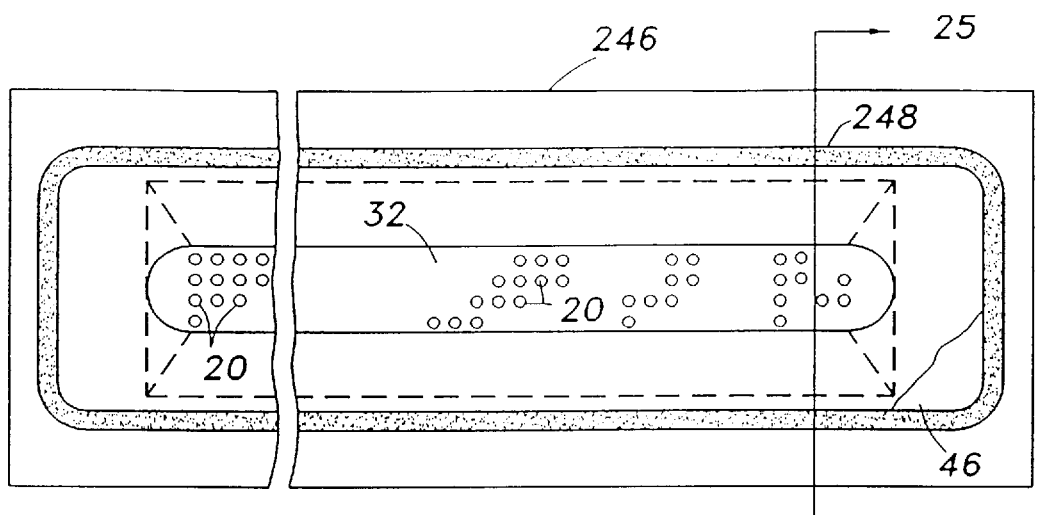
FIG. 24 is a top plan view of a bushing assembly of the present invention.
Figure 25:
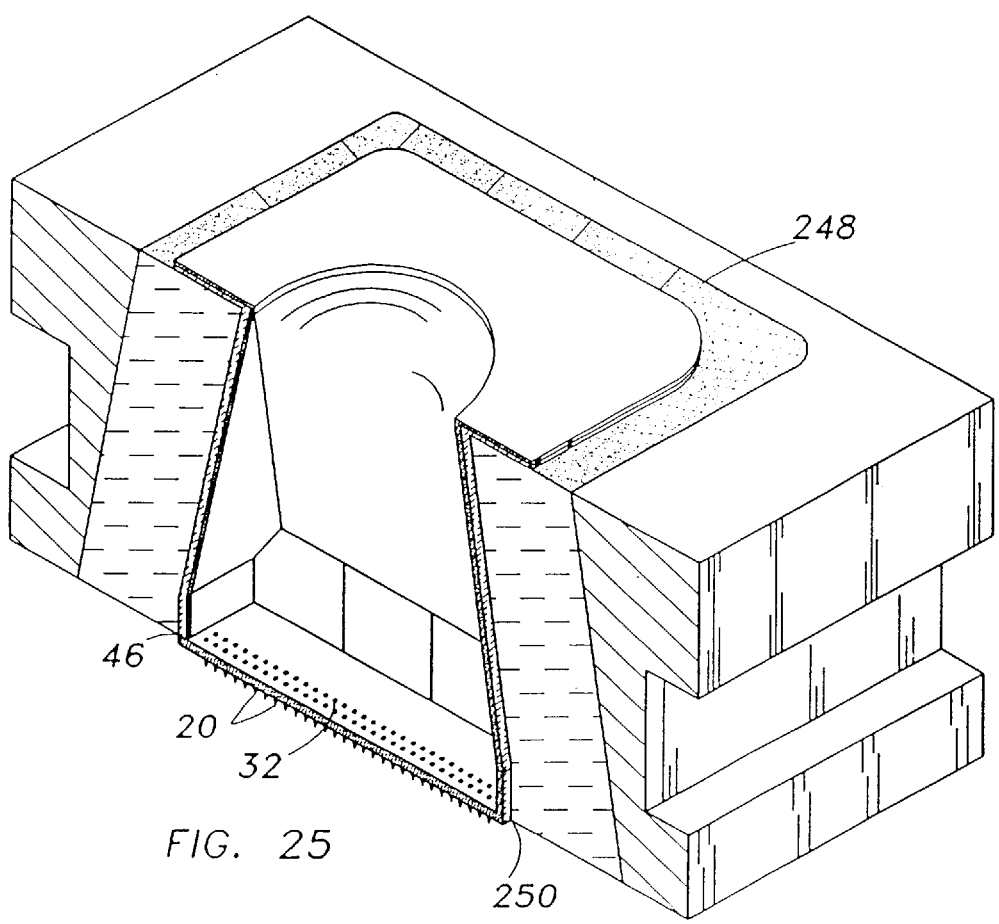
FIG. 25 is a cross-sectional perspective view of the bushing assembly of FIG. 24 taken along line 25—25 of FIG. 24.

The end 222 of the second punch 210 can have a conical tip as shown in FIG. 12 which can, for example, form an angle 218 of about 30° to about 60°, preferably about 40° to about 50°, and more preferably about 45°. Alternatively, the end 222 of the second punch 210 can be curved as shown in FIG. 21. This curvature permits the metallic plate material to flow evenly into the cavity 58 to form the nozzle 20.

The configuration and dimensions of the second punch 210 can vary based upon the desired configuration of the nozzle 20 to be formed.

In a third or punching step, the second punch 210 can be forced into contact with the metallic plate 36,136 by a punch press 312, as discussed above, to form the final shape of the nozzle 20. The pressure at which the second punch 210 impacts the first side 46 of the metallic plate 36, 136 to punch the predetermined region 44, 144 to form the nozzle 20 can be about 3 to about 7 tons, and preferably about 5 to about 6 tons for a metallic plate 36, 136 having a thickness of about 1 to about 1.3 mm (about 0.040 to about 0.050 inches).

As shown in FIG. 6, the system 34 preferably includes an alignment device for sequentially aligning each of the predetermined regions 44, 144 of the metallic plate 36, 136 with the support 52, the first punch 104, the second punch 210 and, if desired, the pressure member or down-holder 110, for forming each of a plurality of nozzles 20 in the metallic plate 36, 136. The alignment device can be a manual or automatic X-Y table 228 upon which the metallic plate 36, 136 is positioned for punching. Preferably, the X-Y table 228 has one or more retainers 230, such as hydraulic or manual grippers or positioning pins, for positioning and retaining the metallic plate 36, 136 upon the X-Y table 228.

As shown in FIG. 6, the movement of the X-Y table 228 by a motor (not shown) to align each of the predetermined regions 44, 144 of the metallic plate 36, 136 to form each of the plurality of nozzles 20 can be controlled by a conventional controller or computer, for example by computer numerical control, in response to input signals of X-Y coordinates furnished to the controller by an operator (not shown). Such controllers are well known to those skilled in the art and further discussion thereof is not believed to be necessary. Preferably, the motor is an AC motor of about 0.1 to about 0.2 horsepower.

The system 34 can further include a feeder 300, shown in FIG. 6, for individually feeding each of a plurality of metallic plates 36, 136 in succession to the X-Y table. The feeder 300 can be manual or automatic, and is preferably a robotic device which successively inserts metallic plates 36, 136 in a position to be gripped by the retainers 230 prior to punching and removes the punched metallic plates from the retainers 230 after formation of the nozzles 20 in the metallic plate. Such feeders are well known to those skilled in the art and further discussion thereof is not believed to be necessary in view of the present disclosure.

A non-limiting example of a suitable system 34 or punch press for use in the present invention is Model No. PWS 610/32, which is a computer-controlled metal forming center commercially available from BalTec Maschinenbau AG of Switzerland or BalTec Corporation of Carnegie, Pa. See "BalTec PWS 610/32, CNC Metal-working centre for the highest precision requirements", a technical bulletin of BalTec Maschinenbau AG at pages 1–6, which is hereby incorporated by reference. The BalTec metal forming center can perform different operations such as punching, bending, reworking, nibbling, coining and drawing of generally flat metal sheets in response to input signals from an operator. "BalTec PWS 610/32" at page 2.

The BalTec metal forming center includes a hydraulically operated ram controlled by a CNC path-measuring system (Z-axis) by means of an NC (numerical control) valve. "BalTec PWS 610/32" at page 3. The press is double-acting and includes hydraulic cylinders for programmable hold down pressure integrated into the ram, if desired. "BalTec PWS 610/32" at page 3. The maximum ram pressure is 250 kN and the maximum hold down force of the BalTec PWS 610/32 is 50 kN. The lower platen includes two-dimensional feed (X- and Y-axis) supported on anti-friction bearings and driven by AC motors through circulating ball spindles capable of moving the metallic plate 36 in programmed increments of 0.001 mm. "BalTec PWS 610/32" at page 3.

For manual operation, the X and Y traverses are 600 mm and 300 mm, respectively. "BalTec PWS 610/32" at page 4. For automatic operation, the X and Y traverses are 600 mm and 250 mm, respectively. "BalTec PWS 610/32" at page 4. The working range of the Z-axis is 88 mm. "BalTec PWS 610/32" at page 4. The traverse rate in the X and Y directions is up to about 18 meters/minute. "BalTec PWS—the complete work station", a technical bulletin of BalTec Maschinenbau AG (Switzerland 1989) at pages 1–3, which is hereby incorporated by reference.

The system 34 preferably comprises a finisher 238, shown in FIG. 6, for finishing a tip 19 of each of the plurality of nozzles 20. Preferably, the finisher 238 is an electric discharge machine (EDM) which cuts each of the tips 19 of the nozzles 20, such as is commercially available as Model No. DWC 110 from Mitsubishi Electric through MC Machinery of Chicago, Ill. Other suitable finishers include The E-H Series and AgieCut Series, which are commercially available from Le Blonde Makino Machine Tool Co. of Mason, Ohio and Agie Industrial Electronics, Ltd. of Losone, Switzerland, respectively.

When a plurality of bushing plates 132 are to be formed from sections 137 of a metallic plate 136, the system 34 preferably comprises a separator 239 for separating the sections 137 to form the plurality of bushing plates 132, as shown in FIG. 6. A non-limiting example of a separator 239 is a conventional sheet metal shear, which is well known to those skilled in the art. Other separators are well known to those skilled in the art.

The bushing plate 32 formed according to the present invention can be used in any conventional bushing 16. A preferred bushing 16 in which a bushing plate 32 formed according to the present invention can be used is shown in FIGS. 1 and 22–25 and is disclosed in U.S. Pat. No. 5,147,431, which is hereby incorporated by reference.

The preferred bushing 16 is formed by joining a flange portion 240, side walls 242 and end walls 244 to the bushing plate 32 by welding to form the bushing 16. A suitable welding technique is the tungsten inert gas welding technique, which is well known to those skilled in the art.

The bushing 16 is supported in a metal frame 246, such as cast iron, and cemented into place with an insulating castable refractory material 248, such as H-W LIGHT-WEIGHT CASTABLE 30™, which is commercially available from Harbison-Walker Corporation of Pittsburgh, Pa.

A heat resistant cushioning material 250, such as FIBER-FRAX® material which is commercially available from Carborundum, is positioned under the flange portion 240 to accommodate any thermal expansion of the bushing 16 with respect to the insulating castable refractory material 248.

A method according to the present invention for forming a nozzle in a bushing plate will now be described generally.

With reference to FIGS. 6 and 13–19, the method generally comprises the initial step of aligning the first punch 104 having a conical tip 106 with the cavity 58 of a support 52. The predetermined region 44 of the metallic plate 36 in which the nozzle 20 is to be formed is positioned between the conical tip 106 of the first punch 104 and the cavity 58. The periphery 50 of the predetermined region 44 of the second side 48 of the metallic plate 36 is supported upon the support 52.

In a first step, the predetermined region 44 of the first side 46 of the metallic plate 36 is indented or punctured with the conical tip 106 of the first punch 104 to displace a portion of the predetermined region 44 into the cavity 58 to form an indentation 108 in the first side 46 of the metallic plate 36, preferably while maintaining the periphery 50 of the predetermined region 44 of the first side 46 of the metallic plate 36 essentially free of any externally applied holding pressure.

In a second step, the metallic plate 36 is punctured at the indentation 108 with a second punch 210 to drive the portion of the predetermined region 44 into the cavity 58, preferably while maintaining the periphery 50 of the predetermined region 44 of the first side 46 of the metallic plate 36 essentially free of any externally applied holding pressure, to preliminarily form the nozzle 20 between the second punch 210 and the cavity 58.

In a third step, the metallic plate 36 is punched at the indentation 108 with the second punch 210 to form the nozzle 20 in the metallic plate 36. Preferably, the metallic plate 36 is punched in the third step while maintaining an externally applied holding pressure on the periphery 50 of the predetermined region 44 during at least a portion of the third punching step.

A method according to the present invention for forming a plurality of bushing plates from a metallic plate, each bushing plate having a plurality of nozzles formed therein, will now be described generally.

With reference to FIGS. 6 and 13–18, the method generally comprises the initial step of aligning the first punch 104 having the conical tip 106 with the cavity 58 of the support 52. A predetermined region 144 of a plurality of predetermined regions 144 of a metallic plate 136 is positioned between the conical tip 106 of the first punch 104 and the cavity 58 wherein a nozzle 20 is to be formed in each of the plurality of predetermined regions 144.

The periphery 150 of each of the plurality of predetermined regions 144 of the second side 148 of the metallic plate 136 is supported upon the support 52. The predetermined region 144 of the first side 146 of the metallic plate 136 is indented or punctured with the conical tip 106 of the first punch 104 to displace a portion of the predetermined region 144 into the cavity 58 to form an indentation 108 in the first side 146 of the metallic plate 136, preferably while maintaining the periphery 150 of the predetermined region 144 of the first side 146 of the metallic plate 136 essentially free of any externally applied holding pressure.

The metallic plate 136 is punctured at the indentation 108 with the second punch 210 in a second step to drive the portion of the predetermined region 144 into the cavity 58, preferably while maintaining the periphery of the predetermined region 144 of the first side 146 of the metallic plate 136 essentially free of any externally applied holding pressure, to preliminarily form the nozzle 20 between the second punch 210 and the cavity 58.

The predetermined region 144 is punched with the second punch 210 in a third step for driving the portion of the predetermined region 144 into the cavity 58 to form the nozzle 20 between the second punch 210 and the cavity 58, preferably while maintaining the periphery 150 of the predetermined region 144 of the first side 146 of the metallic plate 136 essentially free of any externally applied holding pressure during at least a portion of the third punching step.

Each of the predetermined regions 144 of the metallic plate 136 is sequentially aligned each with the support 52, the first punch 104, the second punch 210 and, if desired, the pressure member for forming each nozzle 20 in the metallic plate 136.

The tip 320 of each of the plurality of nozzles 20 is finished, for example by cutting with an electric discharge machine. The sections 137 are separated, for example by cutting, to form the plurality of bushing plates 32.

The methods and system of the present invention will now be illustrated by the following specific, non-limiting example.

EXAMPLE

A plate of platinum-rhodium alloy about 1.2 mm (about 0.047 inches) thick, 305 mm (about 12 inches) length and 76 mm (about 3 inches) was inserted into the retainers of a BalTec PWS 610/32 press as discussed above. The plate was aligned with the cavity of a forming die such as is discussed above and a first punch of titanium nitride-coated high speed steel having a 45° angle conical tip. The cavity and each of the punches used to produce the nozzles in this example were configured to produce nozzles of a shape similar to that shown in FIG. 19. The plate was punched in each of a plurality of predetermined regions to form a plurality of indentations. The pressure applied by the first punch to the plate was about 3 to about 7 tons.

The first punch was removed from the punch press and a second punch was positioned and aligned with the plate and cavity of the forming die. The second punch was formed from titanium nitride-coated high speed steel and had a radius of curvature of about 4.75 mm (about 0.187 inches). The plate was punched using about 5 to about 7 tons pressure at each of a plurality of indentations to form a plurality of preliminary nozzles. In a third step, the plate was punched again with the second punch at about 3 to about 7 tons pressure to form each of the 400 nozzles in the plate. Each of the 400 nozzles produced in the plate were finished using a conventional EDM such as is described above to a length of about 3 mm (about 0.120 inches).

From the foregoing description, it can be seen that the present invention provides a simple, economical system and methods for making nozzles in a bushing plate and for forming a plurality of bushing plates from a single metallic plate. The present system and methods thereby increase efficiency and productivity and provide bushing plates having high quality nozzles.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, I claim:

1. A system for forming a plurality of bushing plates from a metallic plate, each bushing plate having a plurality of nozzles formed therein, comprising:
   (a) a metallic plate having a first side, a second side, and a plurality of sections, each of the plurality of sections corresponding to a bushing plate and having a plurality of predetermined regions, wherein a nozzle is to be formed in each of the plurality of predetermined regions, the second side of the metallic plate being essentially free of protrusions in the predetermined regions, each of the plurality of predetermined regions having a periphery;
   (b) a support for supporting the periphery of each of the plurality of predetermined regions of the second side of the metallic plate, the support having a cavity shaped to generally correspond to an exterior surface of the nozzle to be formed;
   (c) a first punch having a conical tip for displacing a portion of the predetermined region into the cavity to form an indentation in the first side of the metallic plate in a first step;
   (d) a second punch, having a shape generally corresponding to an interior surface of the nozzle to be formed, for driving the portion of the predetermined region into the cavity to preliminarily form the nozzle between the second punch and the cavity in a second step and for punching the metallic plate at the indentation to form the nozzle in the metallic plate between the second punch and the cavity in a third step, wherein the periphery of the predetermined region of the first side of the metallic plate is maintained essentially free of any externally applied holding pressure during at least a portion of a step selected from the group consisting of the first step, the second step and the third step;
   (e) an alignment device for sequentially aligning each of the predetermined regions of the metallic plate with the support, the first punch, the second punch and the pressure member for forming each nozzle in the metallic plate;
   (f) a finisher for finishing a tip of each of the plurality of nozzles; and
   (g) a separator for separating the sections to form the plurality of bushing plates.

2. The system according to claim 1, wherein the metallic material of (a) is a platinum-rhodium alloy.

3. The system according to claim 1, wherein the second side of the metallic plate in step (a) is essentially free of embossments in the predetermined regions.

4. The system according to claim 3, wherein the second side of the metallic plate in step (a) is essentially free of coins in the predetermined regions.

5. The system according to claim 1, wherein the second side of the metallic plate is free of protrusions in the predetermined region in which the nozzle is to be formed.

6. The system according to claim 1, wherein the conical tip of the first punch has an angle of about 30 to about 60 degrees.

7. The system according to claim 1, wherein in the first step the indentation has a depth of less than about one-half of a thickness of the metallic plate.

8. The system according to claim 1, wherein the periphery of each of the predetermined regions of the first side of the metallic plate is maintained free of externally applied holding pressure during at least a portion of the first step.

9. The system according to claim 1, wherein the periphery of each of the predetermined regions of the first side of the metallic plate is maintained free of externally applied holding pressure during at least a portion of the second step.

10. The system according to claim 1, wherein the periphery of each of the predetermined regions of the first side of the metallic plate is maintained free of externally applied holding pressure during at least a portion of the third step.

11. The system according to claim 1, wherein the periphery of each of the predetermined regions of the first side of the metallic plate is maintained essentially free of externally applied holding pressure during at least a portion of each of the first step, the second step and the third step.

12. The system according to claim 1, wherein the finisher is a electrical discharge machine.

13. The system according to claim 1, further comprising a plurality of supports for simultaneously supporting the periphery of each of the plurality of predetermined regions of the second side of the metallic plate.

14. The system according to claim 13, wherein the plurality of supports comprises a first support having a cavity shaped to correspond to an exterior surface of a first nozzle of the plurality of nozzles to be formed and a second support having a cavity shaped to correspond to an exterior surface of a second nozzle of the plurality of nozzles to be formed, the first nozzle having a different exterior surface than the second nozzle.

15. The system according to claim 13, further comprising a plurality of first punches for essentially simultaneously forming indentations in each of the plurality of predetermined regions.

16. The system according to claim 15, wherein the plurality of first punches comprises a first punch having a conical tip and a second punch having a conical tip different from the conical tip of the first punch.

17. The system according to claim 13, further comprising a plurality of second punches for essentially simultaneously puncturing the metallic plate at each of the plurality of indentations.

18. The system according to claim 17, wherein the plurality of second punches comprises a second punch having a shape corresponding to an interior surface of a first nozzle of the plurality of nozzles to be formed and another second punch having a shape corresponding to an interior surface of a second nozzle of the plurality of nozzles to be formed, the shapes of the second punches being different from each other.

19. The system according to claim 1, further comprising a pressure member for applying an external holding pressure to the periphery of the predetermined region of the metallic plate during at least a portion of the third step.

20. A method for forming a nozzle in a bushing plate, comprising the steps of:
   (a) aligning a first punch having a conical tip with a cavity of a support;
   (b) positioning a predetermined region of a metallic plate in which a nozzle is to be formed between the conical tip of the first punch and the cavity, the metallic plate having a first side and a second side which is essentially free of protrusions in the predetermined region, the predetermined region having a periphery;

(c) supporting the periphery of the predetermined region of the second side of the metallic plate upon the support;

(d) indenting the predetermined region of the first side of the metallic plate with the conical tip of the first punch to displace a portion of the predetermined region into the cavity to form an indentation in the first side of the metallic plate;

(e) puncturing the metallic plate at the indentation with a second punch to drive the portion of the predetermined region into the cavity to preliminarily form the nozzle between the second punch and the cavity, the second punch having a shape generally corresponding to an interior surface of the nozzle; and (f) punching the metallic plate at the indentation with the second punch to form the nozzle in the metallic plate between the second punch and the cavity, wherein the periphery of the predetermined region of the first side of the metallic plate is maintained essentially free of any externally applied holding pressure during at least a portion of a step selected from the group consisting of steps (d), (e) and (f).

21. The method according to claim 20, wherein the second side of the metallic plate is free of protrusions in the predetermined region in which the nozzle is to be formed.

22. The method according to claim 20, wherein during at least a portion of step (d) the periphery of the predetermined region of the first side of the metallic plate is maintained free of externally applied holding pressure.

23. The method according to claim 20, wherein during at least a portion of step (e) the periphery of the predetermined region of the first side of the metallic plate is maintained free of externally applied holding pressure.

24. The method according to claim 20, wherein during at least a portion of step (f) the periphery of the predetermined region of the first side of the metallic plate is maintained free of externally applied holding pressure.

25. The method according to claim 20, wherein during at least a portion of step (f) an externally applied holding pressure is maintained on the periphery of the predetermined region.

26. The method according to claim 20, further comprising punching the nozzle formed in the metallic plate by the second punch with another second punch to further define a shape of the nozzle.

27. A method for forming a plurality of bushing plates from a metallic plate, each bushing plate having a plurality of nozzles formed therein, comprising the steps of:

(a) aligning a first punch having a conical tip with a cavity of a support;

(b) positioning a predetermined region of a plurality of predetermined regions of a metallic plate between the conical tip of the first punch and the cavity wherein a nozzle is to be formed in each of the plurality of predetermined regions, the metallic plate having a first side, a second side which is essentially free of protrusions in each of the plurality of predetermined regions, and a plurality of sections, each section corresponding to a bushing plate and having a plurality of predetermined regions, each of the predetermined regions having a periphery;

(c) supporting the periphery of each of the plurality of predetermined regions of the second side of the metallic plate upon the support, the support having a cavity shaped to generally correspond to an exterior surface of the nozzle to be formed;

(d) indenting the predetermined region of the first side of the metallic plate with the conical tip of the first punch to displace a portion of the predetermined region into the cavity to form an indentation in the first side of the metallic plate;

(e) puncturing the metallic plate at the indentation with a second punch to drive the portion of the predetermined region into the cavity to preliminarily form the nozzle between the second punch and the cavity, the second punch having a shape generally corresponding to an interior surface of the nozzle;

(f) punching the predetermined region with the second punch for driving the portion of the predetermined region into the to form the nozzle between the second punch and the cavity, wherein the periphery of the predetermined region of the first side of the metallic plate is maintained essentially free of any externally applied holding pressure during at least a portion of a step selected from the group consisting of steps (d), (e) and (f);

(g) sequentially aligning each of the predetermined regions of the metallic plate with the support, the first punch and the second punch for forming each nozzle in the metallic plate;

(h) finishing a tip of each of the plurality of nozzles; and (i) separating the sections to form the plurality of bushing plates.

* * * * *